(12) United States Patent
Bharadwaj et al.

(10) Patent No.: US 11,150,894 B2
(45) Date of Patent: Oct. 19, 2021

(54) SYSTEMS AND METHODS FOR SOFTWARE BUILD FILE ANALYTICS

(71) Applicant: ServiceNow, Inc., Santa Clara, CA (US)

(72) Inventors: Antesh Bharadwaj, Kanpur (IN); Soumen Pal, Hyderabad (IN); Kedarnath Suresh Manure, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 9 days.

(21) Appl. No.: 16/424,028

(22) Filed: May 28, 2019

(65) Prior Publication Data

US 2020/0379751 A1    Dec. 3, 2020

(51) Int. Cl.
*G06F 8/71* (2018.01)
*G06F 8/75* (2018.01)
*G06F 16/901* (2019.01)

(52) U.S. Cl.
CPC .................. *G06F 8/71* (2013.01); *G06F 8/75* (2013.01); *G06F 16/9027* (2019.01)

(58) Field of Classification Search
CPC ..... G06F 8/70–71; G06F 8/75; G06F 16/9027
See application file for complete search history.

(56) References Cited

U.S. PATENT DOCUMENTS

| | | | |
|---|---|---|---|
| 5,978,594 | A | 11/1999 | Bonnell et al. |
| 6,321,229 | B1 | 11/2001 | Goldman et al. |
| 6,678,887 | B1 | 1/2004 | Hallman |
| 6,816,898 | B1 | 11/2004 | Scarpelli et al. |
| 7,020,706 | B2 | 3/2006 | Cates |
| 7,027,411 | B1 | 4/2006 | Pulsipher et al. |

(Continued)

OTHER PUBLICATIONS

Wahli et al., "Software Configuration Management A Clear Case for IBM Rational ClearCase and ClearQuest UCM", First Edition published by IBM, pp. 1-398 (Year: 2004).*

(Continued)

*Primary Examiner* — S. Sough
*Assistant Examiner* — Zheng Wei
(74) *Attorney, Agent, or Firm* — Fletcher Yoder PC

(57) ABSTRACT

The present approach relates generally to systems and methods for generating a hierarchical model of a plurality of software development streams, identifying points of interest on the plurality of software development streams having a status indication, and determining descendant development streams corresponding to the points of interest. The present approach also relates to systems and methods for traversing the descendant development streams sequentially in descending order of creation date of the points of interest corresponding to the descendant development streams, determining a software build file status indication for software build files associated with the descendant development streams based at least on the status indication of the points of interest, and evaluating the software build file status indication for the software build files to generate an indication of a first subset of build files having an unfixed status indication and a second subset of build files having a fixed status indication.

20 Claims, 11 Drawing Sheets

(56) References Cited

U.S. PATENT DOCUMENTS

| | | | |
|---|---|---|---|
| 7,076,496 B1* | 7/2006 | Ruizandrade | G06F 8/71 |
| | | | 707/695 |
| 7,313,792 B2 | 12/2007 | Buban et al. | |
| 7,392,300 B2 | 6/2008 | Anantharangachar et al. | |
| 7,603,393 B1* | 10/2009 | Cote | G06F 8/71 |
| 7,617,073 B2 | 11/2009 | Trinon et al. | |
| 7,716,353 B2 | 5/2010 | Golovinsky | |
| 7,769,718 B2 | 8/2010 | Murley | |
| 7,890,802 B2 | 2/2011 | Gerber | |
| 7,925,981 B2 | 4/2011 | Pourheidari | |
| 7,945,860 B2 | 5/2011 | Vambenepe et al. | |
| 7,877,783 B1 | 6/2011 | Cline et al. | |
| 8,037,453 B1* | 10/2011 | Zawadzki | G06F 11/368 |
| | | | 717/107 |
| 8,341,590 B1* | 12/2012 | Poole | G06F 8/71 |
| | | | 717/101 |
| 8,402,127 B2 | 3/2013 | Solin | |
| 8,612,408 B2 | 12/2013 | Trinon | |
| 8,646,093 B2 | 2/2014 | Myers et al. | |
| 8,832,652 B2 | 9/2014 | Mueller | |
| 9,065,783 B2 | 6/2015 | Ding | |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 6/2016 | Mueller | |
| 9,535,737 B2 | 1/2017 | Joy | |
| 9,645,833 B2 | 5/2017 | Mueller | |
| 9,654,473 B2 | 5/2017 | Miller | |
| 9,766,935 B2 | 9/2017 | Kelkar | |
| 9,805,322 B2 | 10/2017 | Kelkar | |
| 2008/0154978 A1* | 6/2008 | Lemar | G06F 16/166 |
| 2010/0083211 A1* | 4/2010 | Poole | G06F 8/75 |
| | | | 717/101 |
| 2010/0153919 A1* | 6/2010 | Kramer | G06Q 10/06 |
| | | | 717/122 |
| 2015/0286558 A1* | 10/2015 | Bartlow | G06F 8/71 |
| | | | 717/131 |
| 2016/0092286 A1* | 3/2016 | Henley | G06F 8/00 |
| | | | 714/57 |
| 2018/0129483 A1* | 5/2018 | Biddle | G06Q 10/06 |
| 2019/0163478 A1* | 5/2019 | Cimadamore | G06F 9/3861 |

OTHER PUBLICATIONS

Author unknown, "AccuRev Web Inteface user's Guide" Version 6.2, published by AccuRev Inc., pp. 1-226 (Year: 2015).*

Jie Ma, "Configuration Management Improvement Stream-overview generator", published by University of Gothenburg, 2010, pp. 1-44, [Retrieved online from <https://gupea.ub.gu.se/bitstream/2077/24575/1/gupea_2077_24575_1.pdf>] (Year: 2010).*

Walrad et al., "The Importance of Branching Models in SCM", published by IEEE, Computing Practices, Sep. 2002, pp. 31-38 (Year: 2002).*

* cited by examiner

SYSTEMS AND METHODS FOR SOFTWARE BUILD FILE ANALYTICS

BACKGROUND

The present disclosure relates generally to the analysis of software development branches.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Enterprises and other organizations may develop various applications (e.g., software) that may be licensed or sold to other entities and implemented on various types of computational systems. Such applications may be implemented using executable computer code (e.g., a script) that may be changed or further developed (e.g., updated, modified) over time. In this manner, developers are able to modify a version of the application to meet additional needs or purposes identified by the organization or entity using the application. The modified computer code (e.g., a subsequent version of the application) may therefore include augmentations to the original computer code of the application.

In many cases, the computer code of the application may be developed on one or more software development streams that enable developers to modify a version or multiple versions of the computer code without disrupting operation of a previously released version of the application. As a result, developers may support various software builds or patches in parallel, each corresponding to different versions of the application that may include, for example, certain feature releases, hotfix releases, and/or patch releases. In some cases, certain of the released versions may contain software bugs discovered subsequent to the release of the versions. Such software bugs may cause certain versions of the application affected with the software bug to run sub-optimally or execute instructions in a manner other than intended. Unfortunately, in the diverse array of software build files created for an application, it may be difficult to determine which of the created software build files are affected with a particular software bug and which remain unaffected.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates generally to systems and methods for identifying versions of an application that may include a particular software bug and distinguishing these versions from other versions of the application where the software bug is resolved or presumed resolved. More specifically, embodiments of the present disclosure are directed to a processor-executable algorithm for predicting an unknown status indication of certain software build files based on a known status indication of chronologically preceding software build files and/or code commits present on a software development stream of the software build files. As discussed herein, the processor-executable algorithm may inspect ancestral software build files or code commits of an application to generate an indication of whether descendant software build files of the application are affected with a particular software bug. In particular, based on an evaluation of points of interest included on the software development stream(s) of the application, the algorithm may assign an "affected" status indication to software build files having the software bug or software build files presumed to have the software bug. Conversely, the algorithm may assign an "unaffected" status indication to software build files in which a detected software bug has been previously resolved (e.g., a developer has manually committed code to the software build file to resolve the software bug) or software build files where the software bug is presumed to be resolved. As such, the processor-executable algorithm may identify a subset of software build files of the application where the software bug is present, or presumed present, and a subset of software build files of the application where the software bug is resolved, or presumed resolved. Accordingly, when an entity encounters a software bug in particular version (e.g., a particular released software build file) of the application, the processor-executable algorithm may be used to facilitate an identification of compatible versions of the application in which the software bug is resolved or presumed resolved. The processor-executable algorithm may therefore significantly reduce a time period that is typically involved for a service agent to locate versions of an application that do not contain a particular software bug or software abnormality identified by an entity. These and other features will be described below with reference to the drawings.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
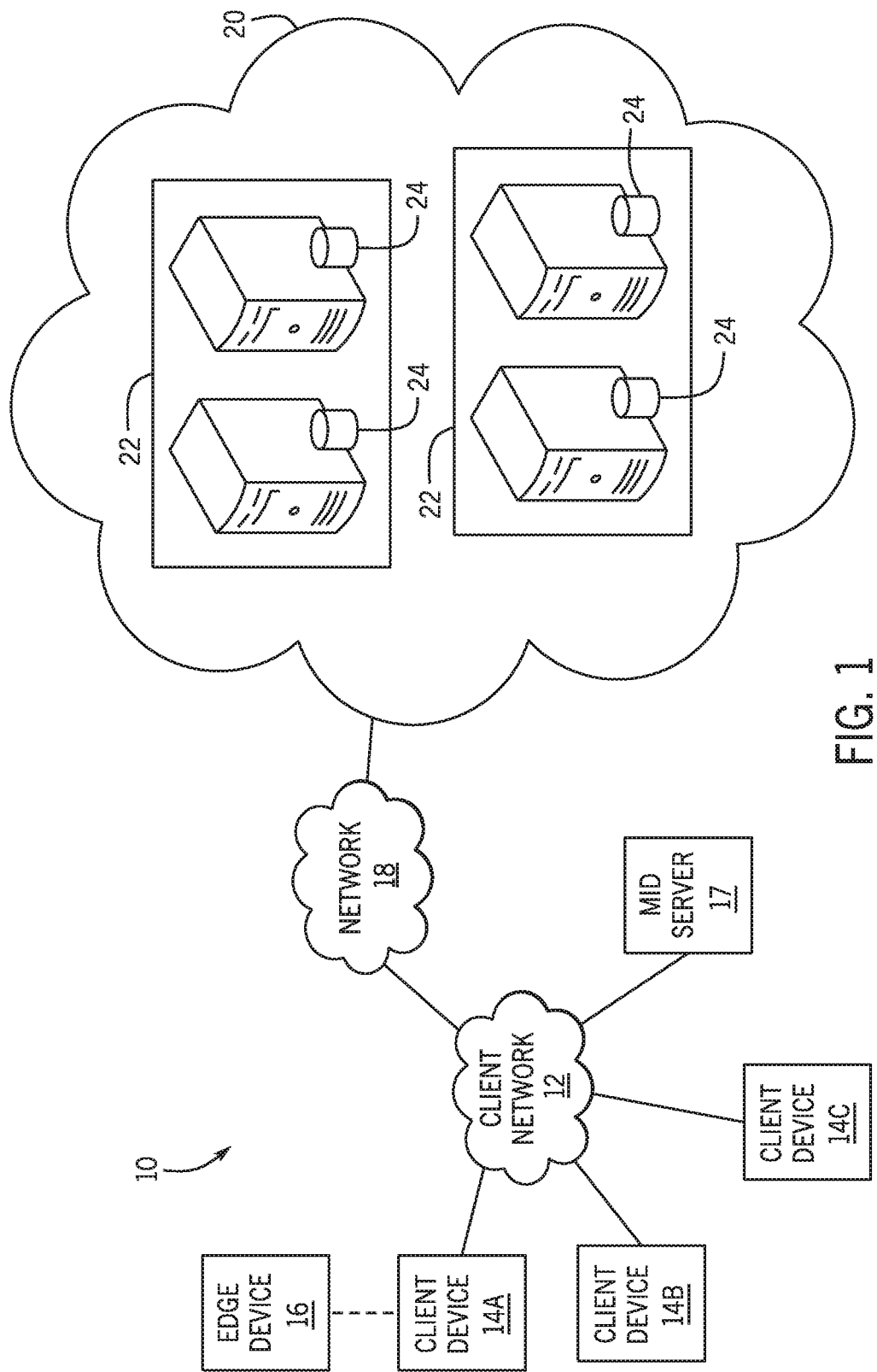
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. In some embodiments, the computing system may employ any suitable circuitry, such as a processor-based device, memory devices, storage devices, and the like. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Furthermore, as used herein, the term "branch" refers to a discrete stream of software development corresponding to developer efforts to modify or augment computer code (e.g., a script) of an application. That is, a branch may enable developers to release feature releases, patch releases, and/or hotfix releases of an application without interrupting operation of previous versions of the application that may reside on separate development branches. As used herein, a "master branch" refers to a stream of software development originating from an original (e.g., unmodified) software build file containing initial source code of an application. As used herein, a "branchpoint" refers to a divergence of a software development stream (e.g., a descendant software development stream) from a parent software development stream (e.g., the master branch). As used herein, "datetime" refers to an index of creation date information of a particular software build file or software development (e.g., a branchpoint) on a software development stream. As an example, the datetime of a particular branchpoint may include the calendar date and time at which a particular development stream branches (e.g., diverges) from a parent development stream.

As used herein, a "code commit" refers to a set of changes in source code applied to a particular software development stream. In some cases, a code commit on a software development stream may not be released to an entity until after creation of a software build file (e.g., a build file) on the software development stream having the code commit. For clarity, as used herein, a "build file" refers to a software build or executable file created using the source code of an application on a particular software development stream and at a particular datetime. For example, a build file on a software development stream (e.g., a software development branch) may contain some or all chronologically preceding code commits made on that software development stream before release of the build file. Accordingly, a build file may be indicative of a version of the application that corresponds to a particular state of the computer code released at the datetime of the build file.

In addition, as used herein, a "point of interest" refers to a branchpoint, a code commit, and/or a build file present on a software development stream. In some cases, each of the points of interest may be associated with an affected or unfixed status indication (e.g., the point of interest includes or presumably includes a particular software bug) or an unaffected or fixed status indication (e.g., the point of interest is void or presumably void of a particular software bug), or the points of interest may be void of a status indication (e.g., it is unknown where the point of interest includes or does not include a particular software bug). As an example, the points of interest may have a "build file affected" status (e.g., a build file having an affected status indication), which refers to a build file of a version of an application where a particular issue (e.g., a software bug) is identified as being present. The points of interest may additionally include "fix targets" (e.g., build files having an unaffected status indication), which refer to build files where a developer has specified intent to fix a particular software bug and/or the developer has fixed the software bug.

With the preceding in mind, and by way of context, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. It should be understood, however, that the present approach may be performed on other computer-based platforms or frameworks, including non-cloud and/or non-instance based platforms.

Turning now to FIG. 1, a block diagram of an embodiment of a cloud computing system 10 where embodiments of the present disclosure may operate, is illustrated. Cloud computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes a bridge device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (which may be referenced herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from certain drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
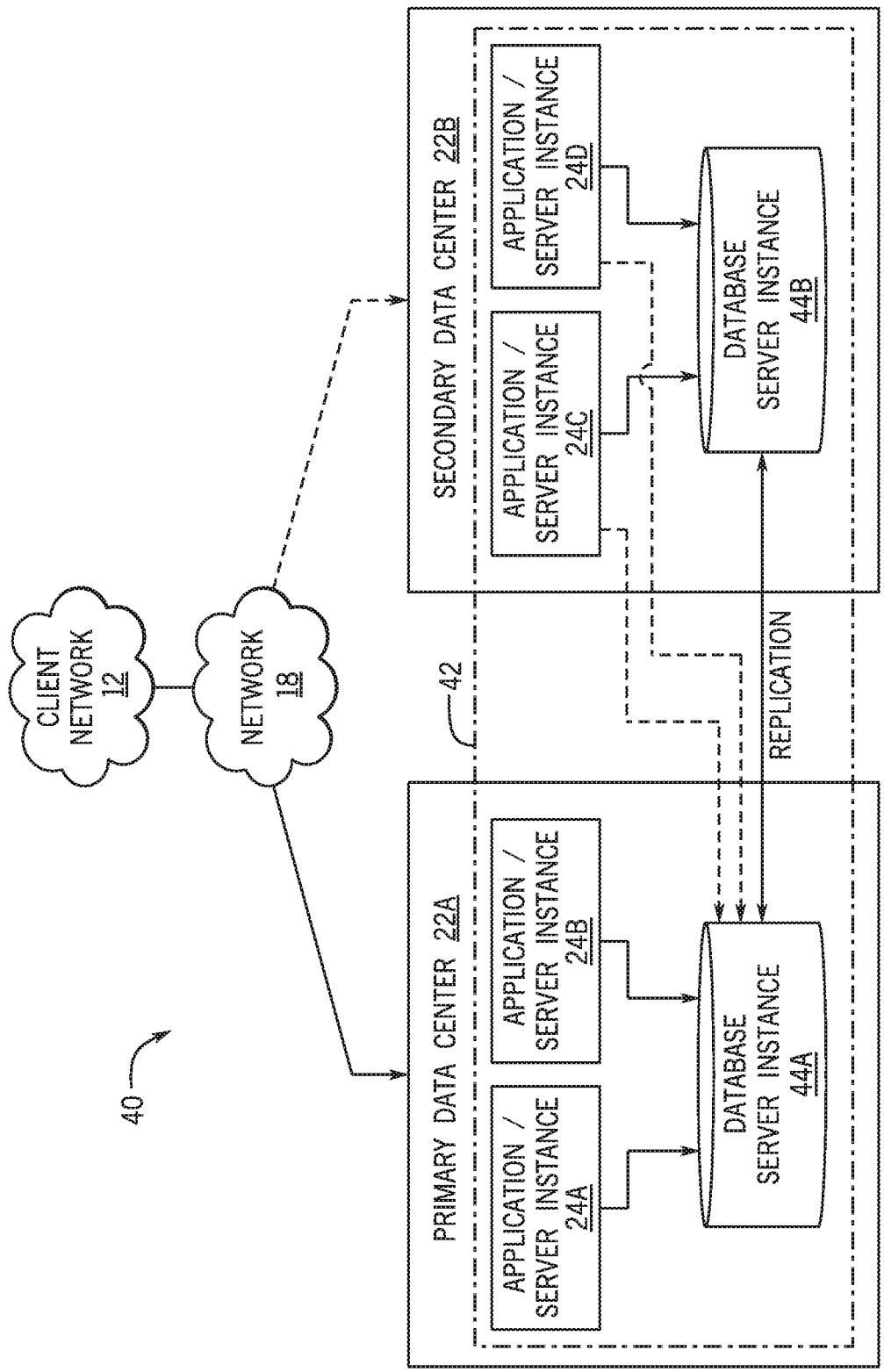
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For example, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
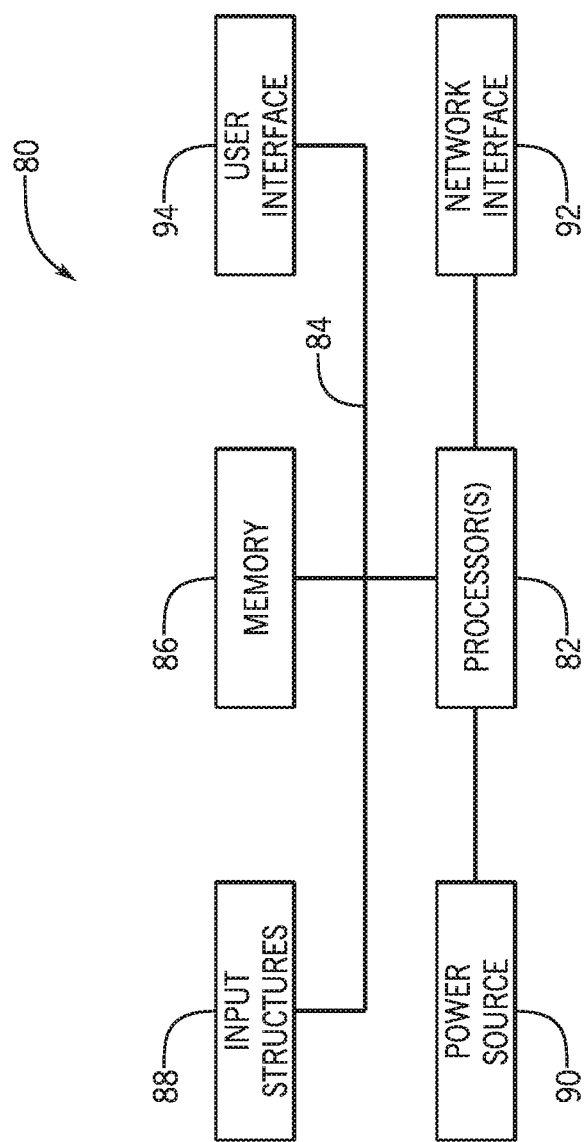
FIG. 3 is a block diagram of an embodiment of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3 and may be present in the embodiments of FIGS. 1 and 2. FIG. 3 generally illustrates a block diagram of example components of a computing system 80 and their potential interconnections or communication paths, such as along one or more busses 84. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein. The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

As noted above, an enterprise or other organization may develop and release various versions of an application for use on any of the aforementioned computing systems. In some cases, an enterprise may modify previous versions of an application to add or modify functionality, to resolve bugs or other error conditions, to optimize performance and/or resource utilization, and so forth. As described in detail below, several versions of an application may be developed in parallel on different software developments streams that branch from an initial, master software build file containing original (e.g., unmodified) source code of the application. Accordingly, the alteration of the source code on these individual software development streams may enable developers to generate various versions of an application while operation of previous versions of the application remains unaffected. That is, operation of a previous version of an application may still be supported even though developers make code commits or other code augmentations to the source code of subsequent versions of the application.

Figure 4:
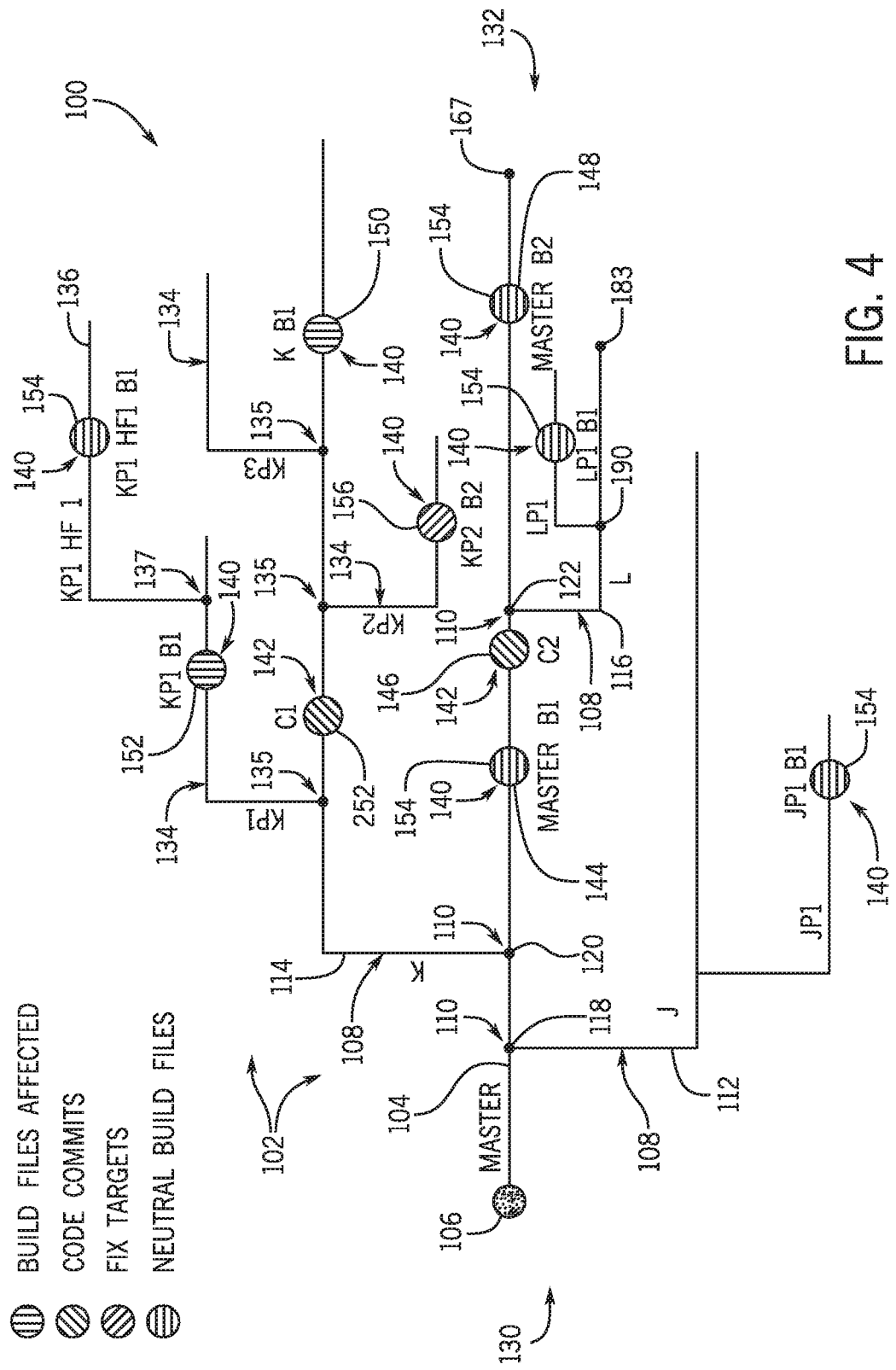
FIG. 4 is schematic diagram of an embodiment of a branch-build timeline showing a plurality of software development streams of an application, in accordance with aspects of the present disclosure.

With the foregoing in mind, FIG. 4 is a graphical illustration of an example of a branch-build timeline 100 (e.g., a multi-branched code development timeline) depicting an interrelationship between a plurality of software development streams 102 (e.g., software development branches) that illustrate development of an application over time. For example, a master software development stream, also referred to herein as a master branch 104, may originate from a master software build file 106 that contains original source code (e.g., unmodified source code) of an application. That is, in some embodiments, the master software build file 106 may be indicative of an initial version (e.g., a first version) of an application made available to an entity as part of a sale, licensing arrangement, or other distribution scheme. A plurality of descendant development streams 108 (e.g., descendant software development streams, descendant branches) may diverge from the master branch 104 to indicate parallel development and modification of the application source code. In other words, code in the descendant development streams 108 may be modified independently of the source code in the master branch 104 and of other development branches. In this manner, modifications to the source code on the descendant development streams 108 may not affect a state of the source code on the master branch 104 or other development branches.

The descendant development streams 108 may diverge from the master branch 104 at respective branchpoints 110. Each of the branchpoints 110 may have corresponding datetime information that is indicative of a creation date of a particular descendant development stream 108. For sake of example, the illustrated embodiment of the branch-build timeline 100 includes three descendant development streams 108 that descend from the master branch 104. In particular, the descendant development streams 108 include a first descendant development stream 112 (e.g., development branch "J"), a second descendant development stream 114 (e.g., development branch "K"), and a third descendant development stream 116 (e.g., development branch "L"), which diverge from the master branch 104 at a first branchpoint 118, a second branchpoint 120, and a third branchpoint 122, respectively. The first, the second, and the third branchpoints 118, 120, 122 are situated on the master branch 104 based on their respective datetime information, with the passage of time indicated in a left to right direction. That is, a location of the branchpoints 110 along the branch-build timeline 100 may be indicative of a creation date of the branchpoints 110, where branchpoints 110 near an initiating end 130 of the branch-build timeline 100 have a creation date preceding a creating date of branchpoints 110 near a terminal end 132 of the branch-build timeline 100. Therefore, in the present example, the first descendant development stream 112 antedates the second descendant development stream 114, and the second descendant development stream 114 antedates the third descendant development stream 116. For clarity, a development stream or branch from which a descendant development stream diverges is referred to herein as the "parent branch" of that particular descendant development stream. Accordingly, in the aforementioned example, the master branch 104 is a parent branch of the first, the second, and the third descendant development streams 112, 114, 116.

Each of the descendant development streams 108 may also include one or more development streams descending therefrom (e.g., secondary descendent development streams). Accordingly, the descendant development streams 108 may be parent branches to these secondary descendant development streams. For example, in the illustrated embodiment, the second descendant development stream 114 includes three secondary descendant development streams 134 (e.g., development branch "KP1", development branch "KP2", and development branch "KP3") extending from the second descendant development stream 114 at respective secondary branchpoints 135. In addition, a tertiary development stream 136 (e.g., development branch "KP1 HF1") extends from a first of the three secondary descendant development streams 134 at a corresponding tertiary branchpoint 137. It should be noted that the branch-build timeline 100 is shown by way of example only, and may include any suitable quantity and arrangement of branch points 110.

As shown in the illustrated embodiment, a plurality of build files 140 (e.g., build file "Master B1", build file "Master B2", build file "LP1 B1", build file "KP1 B1", build file "KP1 HF1 B1", build file "KP2 B2", build file "K B1", build file "JP1 B1") and code commits 142 (e.g., code commit "c1", code commit "c2") are represented on the branch-build timeline 100 and situated on certain of the software development streams 102. Build files 140 and the code commits 142 are associated with respective datetime information that is indicative of a creation date of the build files 140 and a creation date of the code commits 142. Similar to the branchpoints 110 discussed above, build files 140 and code commits 142 situated near the initiating end 130 of the branch-build timeline 100 have a creation date that precedes a creation date of build files 140 and code commits 142 situated near the terminal end 132 of the branch-build timeline 100. Accordingly, a position of the build files 140 and the code commits 142 along the branch-build timeline 100 may be indicative of a creation date of the build files 140 and the code commits 142. The branchpoints 110, the build files 140, and the code commits 142 are collectively referred to herein as "points of interest" of the branch-build timeline 100.

As noted above, the build files 140 may define software code builds (e.g., upgrades, product releases, hotfix patches) that are created on a particular software development stream or branch, which may be released to an entity as a version of an application. Specifically, the build files 140 may include all of the original source code of an application and any alterations to the source code included in an ancestral lineage of the build files 140. As used herein, an "ancestral lineage" of a build file refers to the source code and code commits included in a development stream associated with the build file that precede a creation date of the build file. As an example, an ancestral lineage of a first master build file 144 (e.g., build file "Master B1") created on the master branch 104 may include all of the code commits 142 (e.g., additions, deletions, and/or modifications to the source code) made to the master branch 104 prior to the creation date of the first master build file 144. As such, the first master build file 144 defines a software code build (e.g., an individual version) of the application that contains the source code, as well as certain of the code commits 142 made to the source code on the master branch 104 prior to the creation of the first master build file 144.

As an additional clarifying example, on the master branch 104, a code commit 146 (e.g., code commit "c2") made to the source code after creation of the first master build file 144 (e.g., build file "Master B1") is not included in the first master build file 144 because the first master build file 144 antedates the code commit 146 (e.g., a datetime of the first master build file 144 precedes a datetime of the code commit 142). However, because the code commit 142 was made prior to the creation of a second master build file 148 on the master branch 104, the code commit 142 may be included in the second master build file 148 because the code commit 146 is present on an ancestral lineage of the second master build file 148 (e.g., a datetime of the code commit 146 precedes a datetime of the second master build file 148).

In certain cases, entities using the application may discover errors or other problems (e.g., software bugs) occurring during operation of certain versions of the application (e.g., certain released build files 140 of the application). In some embodiments, a service agent may be notified of a software bug within a particular build file 140 and may thus impart a status indication to that particular build file 140 indicating a presence of the software bug. Specifically, the service agent may associate the build file 140 with an "affected" status indication, thereby identifying the build file 140 as a build file that is affected by a particular software bug. Accordingly, certain of the build files 140 affected with a software bug, referred to herein as "build files affected," may be differentiated from other build files 140 (e.g., other versions of the application) in which the software bug has not been reported.

For sake of example, in the illustrated embodiment of FIG. 4, of the eight build files 140 (e.g., build file "Master B1", build file "Master B2", build file "LP1 B1", build file "KP1 B1", build file "KP1 HF1 B1", build file "KP2 B2", build file "K B1", build file "JP1 B1") included in the branch-build timeline 100, a first build file affected 150 (e.g., build file "K B1") and a second build file affected 152 (e.g., build file "KP1 B1) are shown as having a status indication of "affected." In other words, entities have reported a particular software bug as being present in these version (e.g., build files 140) of the application. The remaining build files 140 will be referred to herein as neutral build files 154, which are void of a status indication. It should be noted that in some circumstances the neutral build files 154 may actually be void of a software bug. However, in other circumstances the neutral build files 154 may include the respective software bug but it has not yet been discovered or confirmed by an entity and/or a service agent. That is, upon discovery of a software bug within a neutral build file 154, the neutral build file 154 status may be changed to indicate that the build file is affected and, therefore, associated with an affected status indication (e.g., an unfixed status indication).

In some embodiments, after receiving an indication of a software bug in a particular build file 140, developers and/or service agents may resolve the identified software bug by, for example, entering code commits to the affected build file along a given software development stream 102. That is, a developer may fix an error (e.g., a software bug) in a build file affected, or preemptively fix a known error in a build file that has not yet been released. In such embodiments, the build files 140 in which a software bug has been resolved will receive an "unaffected" status indication. For clarity, a build file for which the developer has an intent to present a fix to a known issue is referred to herein as a "fix target." Subsequent to the release of that build file, it may be assumed that the issue is fixed or resolved within that development stream. In the present example, a build file of the second descendant development stream 114 is indicated as a fix target 156 (e.g., build file "KP2 B2"), indicating that a developer or service agent has fixed a software bug identified in this build file or preemptively fixed a known software bug. A fix target made to a particular development branch may be presumed to resolve the software bug in all build files created on that development branch after the datetime of the fix target, as well as any build files created on branches descending from the development branch after the datetime of the fix target unless otherwise indicated, as discussed in detail below.

In some embodiments, developers may also attempt to fix a known issue or software bug in a build file by way of a code commit that is made to a software development stream, rather than directly to a particular one of the build files 140. As discussed in greater detail below, code commits made to a particular software development stream may be presumed to resolve a software bug in build files of all branches downstream from the code commit. In other words, build files within an ancestral lineage having a code commit may be presumed as having an "unaffected" status indication. However, in some cases, the code commits 142 may not resolve the software bug, or may introduce another software bug in descendant build files, as discussed in detail below.

Unfortunately, with the existence of multiple, parallel software development streams 102 and versions of the application, it may be difficult and time consuming to determine which of the build files 140 may include a particular software bug (e.g., which of the build files 140 have an affected status or an unfixed status) and which of the build files 140 do not include the software bug (e.g., which of the build files 140 have an unaffected status or a fixed status). For example, an entity may identify a software bug in a particular version of the application, and indicate interest to upgrade to an alternate version of the application where the software bug has been resolved. However, in some case, certain alternate versions of the application may include the same software bug identified by the entity in the version currently being used by the entity. Accordingly, it may be difficult for a service agent to recommend a suitable version of an application to which an entity may upgrade to resolve the issue (e.g., software bug) identified in a current version of the application purchased or licensed by the entity.

Accordingly, embodiments of the present disclosure are directed toward a processor-executable algorithm that may be implemented by any of the aforementioned computing systems and used to identify and/or predict which version(s) of an application may have a specific software bug based on an analysis of the points of interest on the branch-build timeline 100. More specifically, as discussed in detail herein, the algorithm may extrapolate status indication information of the points of interest to predict which versions of an application are likely to have a particular software bug present, and on which versions the software bug is resolved or likely to be resolved. In this manner, the algorithm may facilitate determining which version of an application an entity should upgrade to in order to resolve a particular software bug currently experienced by the entity.

With the preceding in mind, to initiate the analysis of the branch-build timeline 100, the algorithm may generate a hierarchical nodal model of all points of interest included in the branch-build timeline 100. In particular, the algorithm may sequentially traverse each of the software development streams 102 to identify datetime information of the points of interest, generate nodes on the hierarchical nodal model corresponding to the points of interest, and catalogue the generated nodes based on the ancestral relationships of the points of interest. In this manner, the algorithm may generate a hierarchical nodal model where nodes corresponding to points of interest created on descendant software development streams (e.g., the descendant development streams 108) descend from nodes corresponding to points of interest created on parent software development streams (e.g., the master branch 104).

Figure 5:
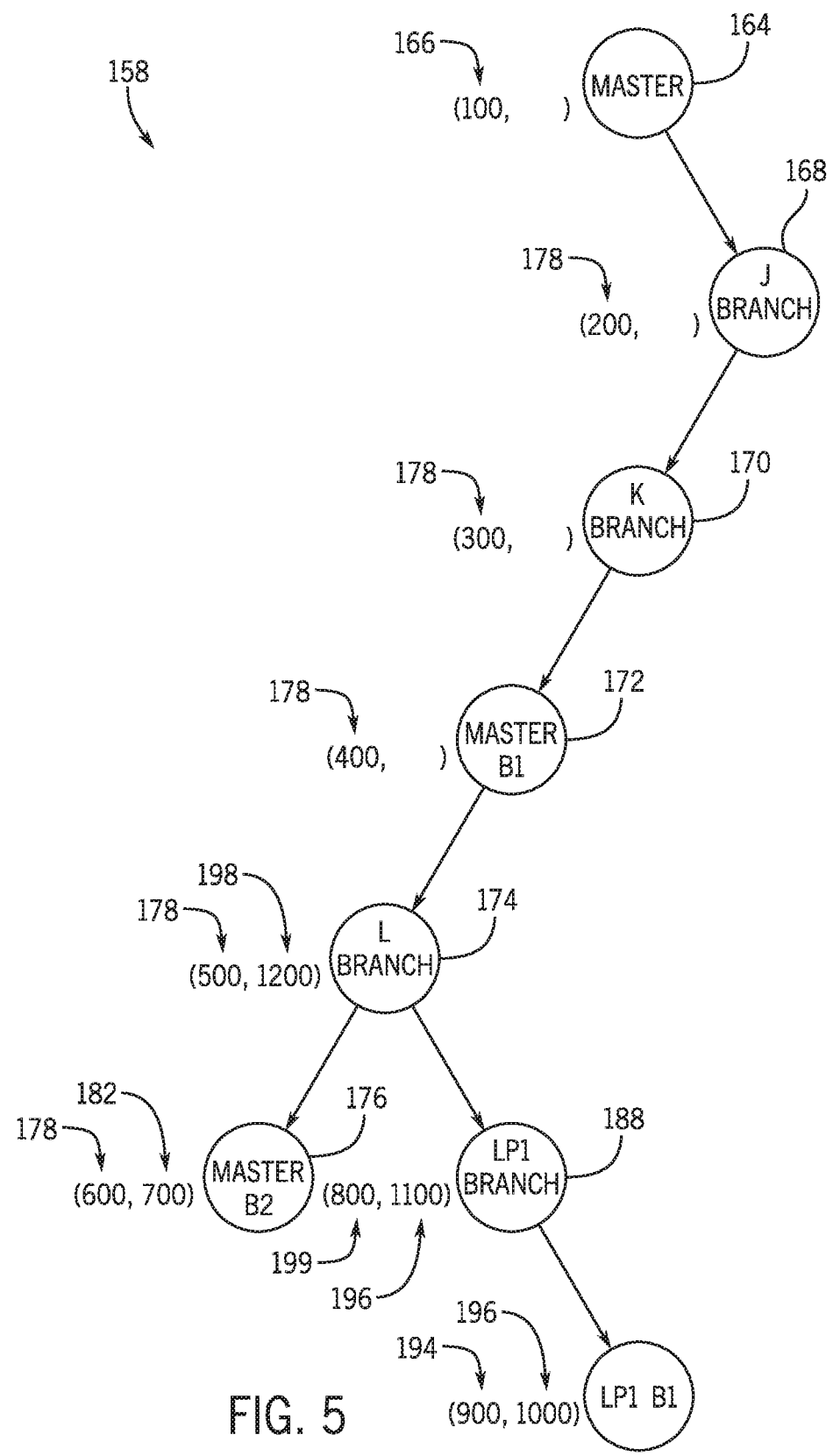
FIG. 5 is a schematic diagram of an embodiment of a portion of a hierarchical nodal model of a branch-build timeline of an application, in accordance with aspects of the present disclosure.

For example, in some embodiments, the algorithm may initiate construction of the hierarchical nodal model by traversing the points of interest on the master branch 104 in ascending chronological order. In this manner, the algorithm may catalogue and organize the points of interest along the master branch 104 in a hierarchical relationship based on a creation date of the points of interest. Specifically, the algorithm may assign indices to each of the nodes generated for particular points of interest, which may be used to organize the nodes based on the respective creation dates of the corresponding points of interest. To help illustrate, FIG. 5 is an embodiment of a portion 158 of a hierarchical nodal model 160 (as shown completed in FIG. 6) of the branch-build timeline 100, which may be generated as the algorithm traverses the master branch 104. To facilitate the following discussion, it should be noted that FIGS. 4 and 5 will be referenced interchangeably.

As shown in the illustrated embodiment of FIG. 5, to generate the hierarchical nodal model 160, the algorithm may first generate a master node 164 that corresponds to the master software build file 106 of the master branch 104. The algorithm assigns a left index value 166 to the master node 164, which may include a predetermined integer value (e.g., "100"). The algorithm may also associate the master node 164 with the datetime information of the master software build file 106, such that the datetime information of the master software build file 106 is stored in the master node 164 (e.g., within a table entry associated with the master node 164). The algorithm continues traversing the points of interest on the master branch 104 in ascending order of creation date until a termination 167 (e.g., an end point) of the master branch 104 is reached. While traversing the master branch 104, the algorithm creates sequentially descending nodes on the hierarchical nodal model 160 corresponding to each of the points of interest traversed along the master branch 104. Specifically, the algorithm creates a first branch node 168, a second branch node 170, a first build node 172, a third branch node 174, and a second build node 176, which are associated with the first branchpoint 118, the second branchpoint 120, the first master build file 144, the third branchpoint 122, and the second master build file 148, respectively. As shown in the illustrated embodiment of FIG. 5, an ancestral relationship of the nodes is determined based on a creation date of the respective points of interest, such that ancestor nodes (e.g., parent nodes) correspond to points of interest having a creation date that precedes a creation date of points of interest corresponding to descendant nodes (e.g., child nodes).

A left index value 178 is assigned to each of the generated nodes of the hierarchical nodal model 160. The left index value 178 of a child node may be indicative of a left index value (e.g., "n") of a parent node increased by a predetermined integer value (e.g., "n+100"). Accordingly, a left index value of child nodes (e.g., descendant nodes) is greater than a left index value of parent nodes (e.g., ancestor nodes) by a predetermined amount (e.g., an integer interval of "100"). As an example, the algorithm may assign the left index value 166 of the master node 164, and the left index values 178 the first branch node 168, the second branch node 170, the first build node 172, the third branch node 174, and the second build node 176, with integer values of "100", "200", "300", "400", "500", and "600", respectively.

Upon reaching the termination 167 of the master branch 104, the algorithm begins traversing the points of interest on the master branch 104 in descending order of creation date until a branchpoint on the master branch 104 is reached. The algorithm assigns a right index value to nodes of the hierarchical nodal model 160 that correspond to points of interest traversed in descending order of creation date. For example, in the exemplary embodiment of the branch-build timeline 100 discussed herein, the algorithm assigns a right index value 182 (e.g., "700") to the second build node 176, which is the only point of interest traversed in descending order of creation date along the master branch 104 before a branchpoint (e.g., the third branchpoint 122) is reached.

Upon reaching the third branchpoint 122, the algorithm traverses all descendant development streams descending from the third descendant development stream 116 and generates nodes on the hierarchical nodal model 160 corresponding to any identified points of interest. The generated nodes will each descend from the third branch node 174 of the hierarchical nodal model 160. The algorithm traverses the third descendant development 116 stream in the same manner as the traversal of the master branch 104. That is, the algorithm traverses the points of interest on the third descendant development stream 116 in ascending order of creation date until a terminal end 183 of the third descendant development stream 116 is reached and generates sequentially descending nodes corresponding to the traversed points of interest on the hierarchical nodal model 160. For example, in the illustrated embodiment, the algorithm generates a branch node (e.g., a fourth branch node 188) corresponding to a branchpoint 190 of the third descendant development stream 116. The fourth branch node 188 descends from the third branch node 174 and is assigned a left index value 199 (e.g., "800") that is increased by the predetermined integer amount (e.g., "100") from a previously assigned index value (e.g., the right index value 182) of the previously generated node (e.g., the second build node 176) on the hierarchical nodal model 160.

Upon reaching the terminal end 183 of the third descending development stream 116, the algorithm traverses the points of interest on the third descendant development stream 116 in descending chronological order until reaching a branchpoint (e.g., the branchpoint 190). The algorithm traverses all points of interest created along the development stream descending from the branchpoint 190 until reaching a terminal end of this descendant development stream. The algorithm generates nodes corresponding to the traversed points of interest and assigns corresponding left index values 194 and right index values 196 to the generated nodes in accordance with the techniques discussed above. Upon returning to the third branchpoint 122 on the branch-build timeline 100, the algorithm assigns a right index value 198 to the third branch node 174, and continues traversing the points of interest along the master branch 104 in descending chronological order in accordance with the aforementioned techniques.

Figure 6:
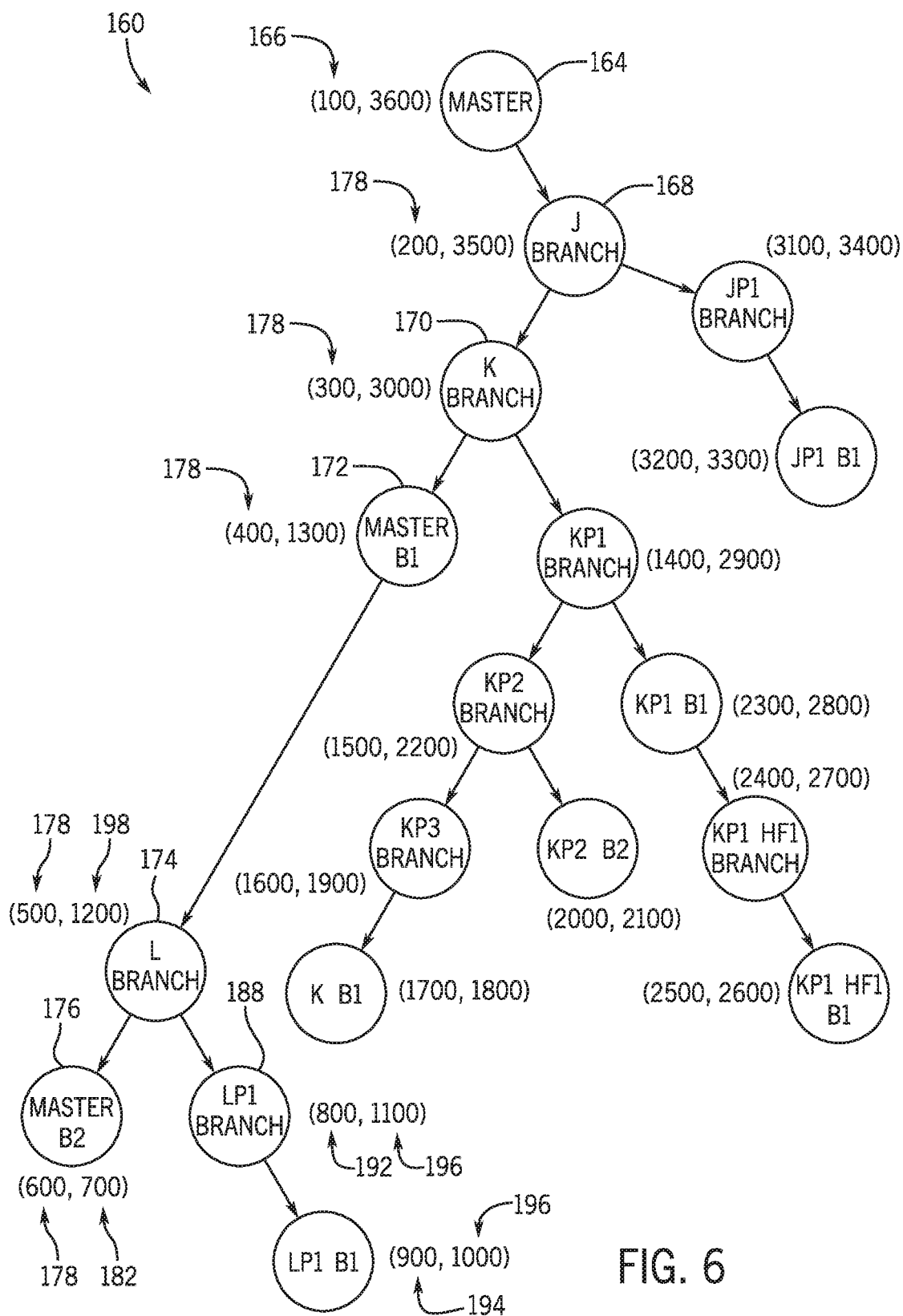
FIG. 6 is a schematic diagram of an embodiment of a completed hierarchical nodal model of a branch-build timeline of an application, in accordance with aspects of the present disclosure.

The algorithm iteratively repeats this process for each descendant development stream (e.g., the second descendant development stream 114, the first descendant development stream 112) of the master branch 104. Accordingly, the algorithm may generate the hierarchical nodal model 160 in which each of the points of interest of the branch-build timeline 100 are catalogued in a hierarchical manner based on an ancestral lineage of the points of interest on the software development streams 102. Accordingly, the hierarchical nodal model 160 may facilitate the identification of ancestral nodes and/or descendant nodes corresponding to a particular point of interest. FIG. 6 is an embodiment of the hierarchical nodal model 160 generated after the algorithm traverses all development streams of the branch-build timeline 100.

Upon generating the hierarchical nodal model 160, the algorithm iteratively traverses the points of interest on the branch-build timeline 100 in descending order of creation date to determine a status indication for certain nodes of the hierarchical nodal model 160 based on a status indication of the traversed points of interest. As described in greater detail below, in this manner, the algorithm may predict and identify versions (e.g., build files 140 corresponding to software build files) of the application in which a software bug is likely present, or presumed to be present, as well as identify versions of the application that are likely void of the software bug, or presumed to be void of the software bug.

Figure 7:
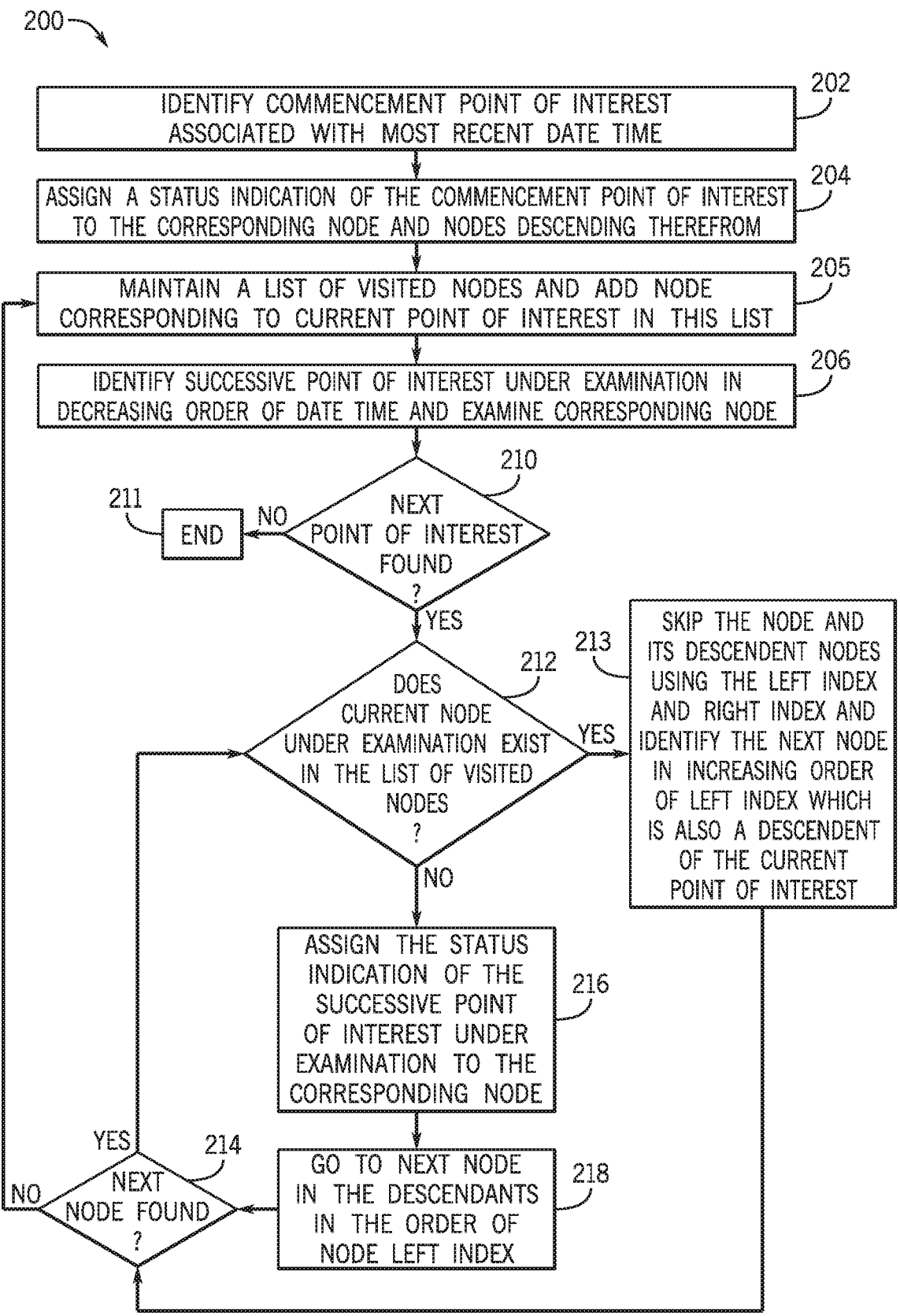
FIG. 7 is a flow diagram of an embodiment of a process for determining affected versions of an application having a software bug, in accordance with aspects of the present disclosure.
Figure 8:
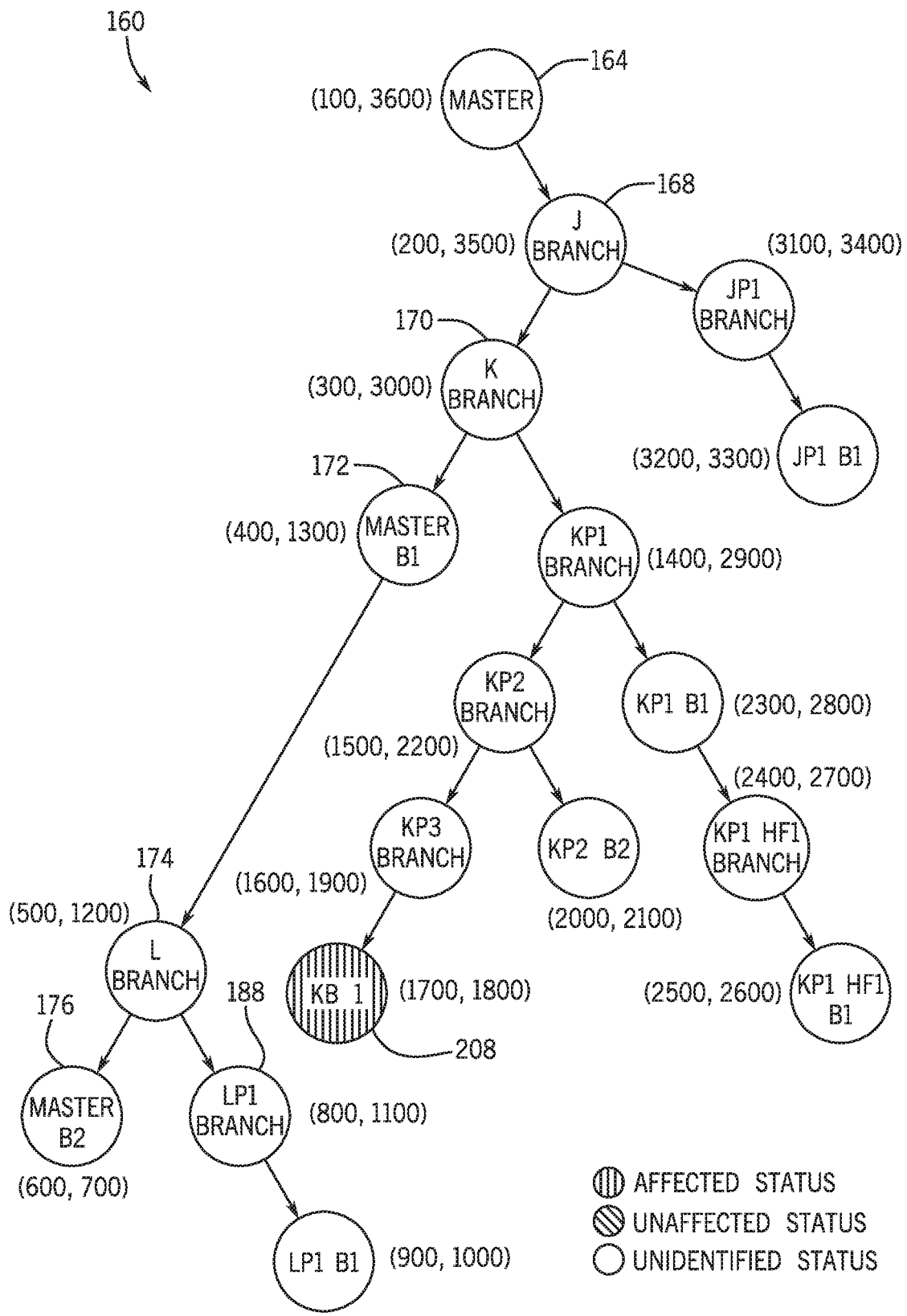
FIG. 8 is a schematic diagram of an embodiment of a hierarchical nodal model of a branch-build timeline illustrating an affected version of an application, in accordance with aspects of the present disclosure.

FIG. 7 is a flow diagram of an embodiment of a process 200 that may be performed by a suitable computing system implementing the present algorithm to identify versions of an application having particular software bugs. It should be noted that the steps illustrated in the process 200 are meant to facilitate discussion and are not intended to limit the scope of this disclosure, since additional steps may be performed, certain steps may be omitted, and the illustrated steps may be performed in any order. Moreover, to help illustrate the iterative approach of the present algorithm, the following discussion will reference FIGS. 4 and 8-11 interchangeably.

With the preceding in mind, the process 200 may begin with identifying which of the points of interest on the branch-build timeline 100 having a status indication is associated with a most recent datetime, as indicated by step 202. This point of interest with a status indication and having an earliest relative creation date will be referred to herein as a "commencement point of interest (POI)." Accordingly, a commencement POI may include a build file affected, a fix target, or a code commit made on any of the software development streams 102, as each of these points of interest are associated with a respective status indication. It is important to note the algorithm may not select points of interest without an associated status indication, such as the neutral build files 154, which are void of a status indication, as the commencement POI. Accordingly, it should be appreciated that the algorithm may disregard certain points of interest absent of a status indication (e.g., neutral build files 154), even if these points of interest have a datetime preceding to a datetime of commencement POI.

Upon identification of the commencement POI, the algorithm assigns the status indication of the commencement POI to a previously generated node of the hierarchical nodal model 160 that corresponds to the commencement POI, as indicated by process block 204. That is, if the commencement POI is a build file affected, the algorithm will assign the node corresponding to this commencement POI with an affected status indication. Conversely, if the commencement POI is a fix target, the algorithm will assign the node corresponding to this commencement POI with an unaffected status indication. Regardless, the algorithm also assigns the status indication of the commencement POI to any nodes of the hierarchical nodal model 160 descending from the node corresponding to the commencement POI.

For example, as shown in the illustrated embodiment of FIG. 4, the commencement POI of the exemplary branch-build timeline 100 is the first build file affected 150 (e.g., build file "K B1"). Accordingly, upon identification of this commencement POI, the algorithm assigns an affected status indication to a previously generated node of the hierarchical nodal model 160 that corresponds to the commencement POI. That is, in the present example, the algorithm assigns an affected status indication to a node 208 corresponding to the first build file affected 150, as shown in the illustrated embodiment of the hierarchical nodal model 160 of FIG. 8. For clarity, the node 208 will be referred to herein as a first status node 208.

As discussed above, it should be noted that code commits created on the branch-build timeline 100 are not represented as nodes on the hierarchical nodal model 160. Accordingly, for a particular code commit, the algorithm assumes that a point of interest on the same branch as the code commit with a datetime immediately consecutive to a datetime of the code commit has an unaffected status indication, if this point of interest has no previously assigned status indication. That is, if the point of interest immediately consecutive to the code commit has no previously assigned status indication, the algorithm propagates an unaffected status indication to this point of interest.

As an example, if a point of interest on the same branch as a particular code commit, with a datetime immediately consecutive to a datetime of the code commit, is a branch-point or a neutral build file, the algorithm will assume that this branchpoint or neutral build file has an unaffected status indication, because a status indication of these points of interest is determined based on a status indication of a preceding point of interest on the branch-build timeline 100 having a status indication (e.g., a build file affected, a fix target, or a code commit). However, as discussed in detail below, if a point of interest on the same branch as the code commit, with a datetime immediately consecutive to a datetime of the code commit, already has an assigned status indication, the algorithm will not propagate an unaffected status indication to this point of interest. For example, if a point of interest on the same branch as a particular code commit with a datetime immediately consecutive to a datetime of the code commit is a build file affected, the algorithm will not adjust the affected status indication associated with the build file affected to an unaffected status indication.

As such, if a code commit is identified as the commencement POI (e.g., meaning that any point of interest chronologically consecutive to the code commit is void of a status indication), the algorithm will assign an unaffected status indication to all points of interest created on branches of the branch-build timeline 100 descending from the code commit. In addition, the algorithm will assign an unaffected status indication to all nodes of the hierarchical nodal model 160 corresponding to the point of interests chronologically consecutive to the code commit.

Therefore, in any case, upon assigning a status indication to a node of the hierarchical nodal model 160 associated with the commencement POI, the algorithm assigns all nodes that may be descending from this node with the same status indication of the commencement POI. As shown in the illustrated embodiment of FIG. 8, because the first status node 208 (e.g., the node corresponding to the commencement POI, the node corresponding to the first build file affected 150) does not have any nodes descending therefore, the algorithm only assigns an affected status indication (e.g., the status indication of the first build file affected 150) to the first status node 208.

The algorithm generates and maintains a memory table or a list indicative of the nodes of the hierarchical nodal model 160 the algorithm has visited, as indicated by step 205. That is, upon assigning a status indication to a particular node (e.g., the first status node 208) of the hierarchical nodal model 160, the algorithm may store this node as a "visited" node in such a memory table. In some embodiments, the algorithm may index the node(s) stored in the memory table based on the left or right index values of the node(s). Further, in embodiments where the algorithm assigns a status indication to one or more nodes descending from, for example, the commencement POI, the algorithm may respectively store and index these nodes in the memory table as having a "visited" status indication. For example, in embodiments where the first status node 208 includes one or more descendant nodes, the algorithm stores the first status node 208, as well as any descendant node receiving a status indication, in the memory table as having a "visited" status indication. As discussed in detail below, the algorithm may reference the memory table during subsequent inspection iterations of the branch-build timeline 100 to determine which nodes of the hierarchical nodal model 160 have been previously traversed and assigned with a status indication.

Upon assigning an appropriate status indication to the node corresponding to the commencement POI, as well as any node(s) descending therefrom, the algorithm determines which point of interest on the branch-build timeline 100 having a status indication has a datetime immediately preceding the datetime of the commencement POI, as indicated by step 206. For clarity, a point of interest examined after examination of a previous point of interest (e.g., the commencement POI) will be referred to herein as a "current point of interest (POI)." Accordingly, in the present case, a point of interest having a status indication and a datetime immediately preceding the date time of the commencement POI will be referred to herein as the current POI.

As indicated by decision block 210, the algorithm determines whether any point of interest having a status indication and a datetime immediately preceding the datetime of the commencement POI exists on the branch-build timeline 100. If the algorithm is unable to determine a point of interest on the branch-build timeline 100 that includes a status indication and has a datetime immediately preceding the datetime of the commencement POI, the algorithm proceeds to step 211 and terminates inspection of the branch-build timeline 100. If the algorithm is able to determine a point of interest (e.g., a current POI) on the branch-build timeline 100 that includes a status indication and has a datetime immediately preceding the datetime of the commencement POI, the algorithm references the aforementioned memory table to determine whether a node on the hierarchical nodal model 160 corresponding to this current POI is listed as having a "visited" status indication, as indicated by decision block 212. Accordingly, the algorithm can determine whether the node corresponding to the current POI is void of a status indication (e.g., an affected status indication or an unaffected status indication).

If the node corresponding to the current POI is indicated as a previously visited node upon reference of the memory table, and thus is already assigned a status indication, the algorithm does not update a status indication of this node and proceeds to traverse all descendant nodes corresponding to the node of the current POI based on the left index value and/or the right index value of these nodes, as indicated by step 213. As an example, the algorithm may traverse all descendant nodes of the node corresponding to the current POI in increasing order of the left index value of these nodes. That is, the algorithm may determine whether a subsequent descendant node (e.g., a node having a greater left index value than the current node under examination) is found, as indicated by decision block 214. As shown in the illustrated embodiment of the process 200, upon identification of a subsequent descendant node, the algorithm returns to the step 212, thereby enabling the algorithm to iteratively inspect the descendant nodes of the node corresponding to the current POI.

If the algorithm is unable to identify a subsequent descendant node in the step 214, the algorithm returns to the step 205. In this manner, the algorithm iteratively identifies a new POI (e.g., a new current POI) for examination, as indicated by the step 206. That is, the algorithm determines a new point of interest having a datetime immediately preceding the datetime of the current POI, and continues through the steps of the process 200. As an example, if the current POI is a code commit, the commencement POI is a build file affected, the current POI and the commencement POI are situated on the same branch of the branch-build timeline 100, and no points of interest are positioned chronologically between the commencement POI and the current POI, then the algorithm does not assign a status indication to any node(s) of the hierarchical nodal model 160 and reverts to the step 205. Accordingly, at the step 206, the algorithm identifies a point of interest immediately preceding the current POI and having a status indication, and updates this point of interest as the current POI (e.g., a new current POI). Additionally, in the step 205, the algorithm stores the node corresponding to the new current POI as a node having a "visited" status indication.

If, upon referencing the aforementioned memory table at the step 212, the algorithm determines that the node on the hierarchical nodal model 160 corresponding to the current POI is not listed as previously visited within the memory table, the algorithm proceeds to step 216. Particularly, at the step 216, the algorithm assigns the status indication of the current POI to the node corresponding to the current POI. To clarify, in the example above, if the current POI is a code commit, the commencement POI is a build file affected, the current POI and the commencement POI are situated on the same branch of the branch-build timeline 100, and a branchpoint (or a neutral build file 154) is positioned chronologically between the commencement POI and the current POI, then the algorithm will assign a status indication (e.g., an unaffected status indication) to a node of the hierarchical nodal model 160 corresponding to the branchpoint (or the neutral build file 154).

Continuing through the illustrated embodiment of the branch-build timeline 100 of FIG. 4, as shown, the current POI under examination after the commencement POI (e.g., the first build file affected 150) is the fix target 156 (e.g., build file "KP2 B2"). As noted above, the fix target 156 is associated with an unaffected status indication. Accordingly, at the step 216, the algorithm assigns an unaffected status indication to a node of the hierarchical nodal model 160 corresponding to the fix target 156. Specifically, as shown in the illustrated embodiment of FIG. 9, the algorithm assigns an unaffected status indication to a node 220, which corresponds to the fix target 156. The node 220 will be referred to herein as the second status node 220.

The algorithm subsequently traverses any descendant node(s) of the second status node 220 (e.g., nodes that include a left index value that is greater than the left index value of the second status node 220), as indicated by step 218. That is, the algorithm determines whether the second status node 220 has a descendant node (e.g., a descendant lineage), as indicated by the decision block 214. In other words, the algorithm determines whether any point(s) of interest descend from the fix target 156. When traversing node(s) (e.g., in increasing order of left index value) that may descend from the second status node 220, the algorithm references the memory table to determine whether the particular node under current examination is indicated as previously visited in the memory table, as indicated by the decision block 212. If the memory table does not indicate the node under current examination as having a "visited" status, the algorithm proceeds to the step 216 and assigns this node with the status indication of the second status node 220. The algorithm then proceeds to iterate through the steps of the process 200. Conversely, if the memory table indicates that the node under current examination includes a "visited" status (e.g., the node is already assigned with a status indication), the algorithm proceeds to the step 213 and does not adjust a status indication of this node.

Figure 9:
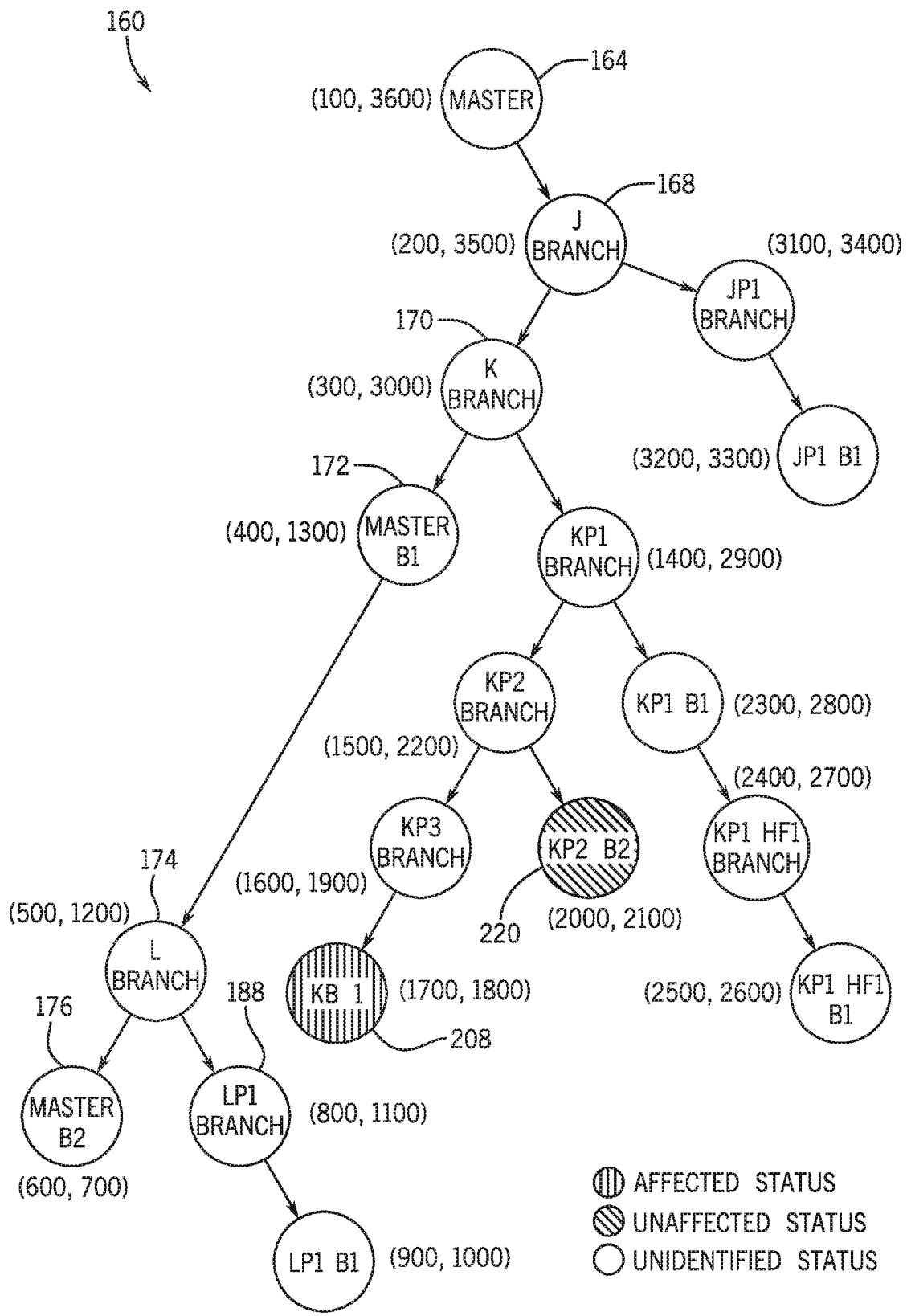
FIG. 9 is a schematic diagram of an embodiment of a hierarchical nodal model of a branch-build timeline illustrating an affected version and an unaffected version of an application, in accordance with aspects of the present disclosure.

As shown in the illustrated embodiment of FIG. 9, because the second status node 220 does not have any nodes descending therefrom, the algorithm only assigns a status indication (e.g., the unaffected status indication) to the second status node 220, and subsequently returns to the step 205. Accordingly, the algorithm may iteratively determine another point of interest for examination that has a datetime preceding a datetime of the current POI (e.g., the fix target 156) and includes a status indication. For clarity, this newly identified point of interest will again be referred to in the succeeding discussion as the "current POI." As such, it should be noted that the "current POI" referenced in the succeeding discussion is associated with a different point of interest on the branch-build timeline 100 than the "current POI" referenced in the preceding discussion.

With the foregoing in mind, as shown in the illustrated embodiment of FIG. 4, the code commit 146 is the current POI examined by the algorithm subsequently to the fix target 156. As noted above, code commits are not separately represented as nodes on the hierarchical nodal model 160. Accordingly, the algorithm propagates an unaffected status indication to a point of interest on the same branch as the code commit 146 and having a datetime immediately consecutive to the datetime of the code commit 146, if this point of interest has no previously assigned status indication. Indeed, as discussed above, it should be noted that if the point of interest immediately chronologically consecutive to the code commit 146 is, for example, a build file affected or a fix target (e.g., a point of interest already having a status indication), the algorithm reverts to the step 205 without assignment of a status indication to any point(s) of interest.

As an example, in the illustrated embodiment of FIG. 4, the third branchpoint 122 is on the same branch as the code commit 146 (e.g., the current POI) and has a datetime immediately chronologically consecutive to the datetime of the code commit 146. Therefore, because the third branchpoint 122 has no previously assigned status indication (e.g., the node corresponding to the third branchpoint 122 is not indicated as having a "visited" status indication in the memory table), the algorithm associates the third branchpoint 122 with an unaffected status indication. As such, the algorithm also assigns an unaffected status indication to a node of the hierarchical nodal model 160 corresponding to the third branchpoint 122, as indicated by the step 216. In particular, as shown in the illustrated embodiment of FIG. 10, the algorithm assigns an unaffected status indication to a node 230 (e.g., a node associated with the third branchpoint 122, the third branch node 174). For clarity, the node 230 will be referred to herein as the third status node 230.

As indicated by the decision block 218, the algorithm subsequently iterates to a descendant node of the third status node 230 that includes a left index value that is greater than the left index value of the third status node 230 (e.g. the algorithm determines whether the third status node 230 has descendant node(s)). That is, the algorithm determines whether any points of interest on the branch-build timeline 100 are descendants of the code commit 142. If the node corresponding to the third status node 230 has one or more descendant lineages, the algorithm traverses each node in the descendent lineage(s) in increasing order of left index value of the node(s) and attempts to assign the traversed node(s) with the same status indication as the status indication of the current POI. That is, if the traversed nodes are not indicated as having a "visited" status in the memory table, as determined in the decision block 212, the algorithm assigns these traversed node(s) with the same status indication as the status indication of the current POI.

Figure 10:
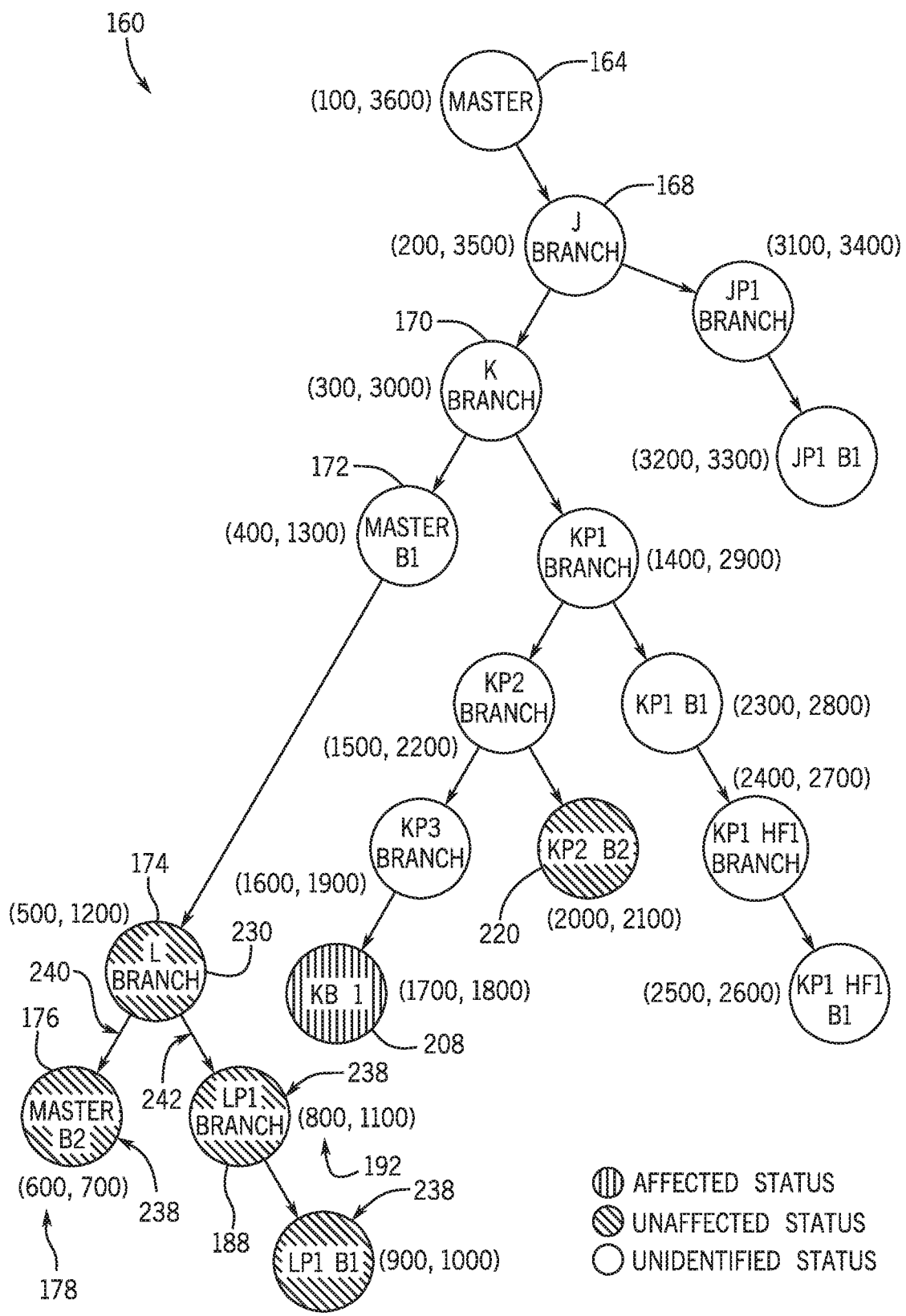
FIG. 10 is a schematic diagram of an embodiment of a hierarchical nodal model of a branch-build timeline illustrating affected and unaffected versions of an application, in accordance with aspects of the present disclosure.

For example, as shown in the illustrated embodiment of the hierarchical nodal model 160 of FIG. 10, the third status node 230 includes three descendant nodes 238 (e.g., child nodes), which are divided among a first descendant lineage 240 and a second descendant lineage 242. As shown in the illustrated embodiment, the second build node 176 is indicative of a leading node of the first descendant lineage 240, while the fourth branch node 188 is indicative of a leading node of the second descendant lineage 242. In some embodiments, the algorithm traverses descendant lineages in order of increasing left index value of the leading nodes. Accordingly, as the left index value 192 of the second build node 176 is less than the left index value 192 of the fourth branch node 188, the algorithm traverses the first descendant lineage 240 prior to traversing the second descendant lineage 242.

For each descendant lineage traversed, the algorithm sequentially assigns the node(s) within the descendant lineage with the same status indication as the ancestor node of the descendant lineage (e.g., the third status node 230) until reaching a terminal end of the descendant lineage or a node that is indicated as a previously visited in the memory table (e.g., a node already assigned with a particular status indication). For example, because the first descendant lineage 240 includes a single node (e.g., the second build node 176) that was not previously traversed by the algorithm (e.g., is without a previously assigned status indication), the algorithm assigns this node with an unaffected status (e.g., the status of the third status node 230, the status of the ancestor node), and subsequently initiates traversal of the second descendant lineage 242. As all nodes within the second descendant lineage 242 have not yet been traversed by the algorithm (e.g., are also void of a previously assigned status indication), the algorithm assigns each of these nodes with an unaffected status, and returns to step 205 of the process 200.

As a clarifying example, if the fourth branch node 188 was already traversed by the algorithm and assigned with a status indication (e.g., an affected status indication), the algorithm would cease traversing the remaining nodes of the second descendant lineage 242 and return to step 205 of the process 200.

Figure 11:
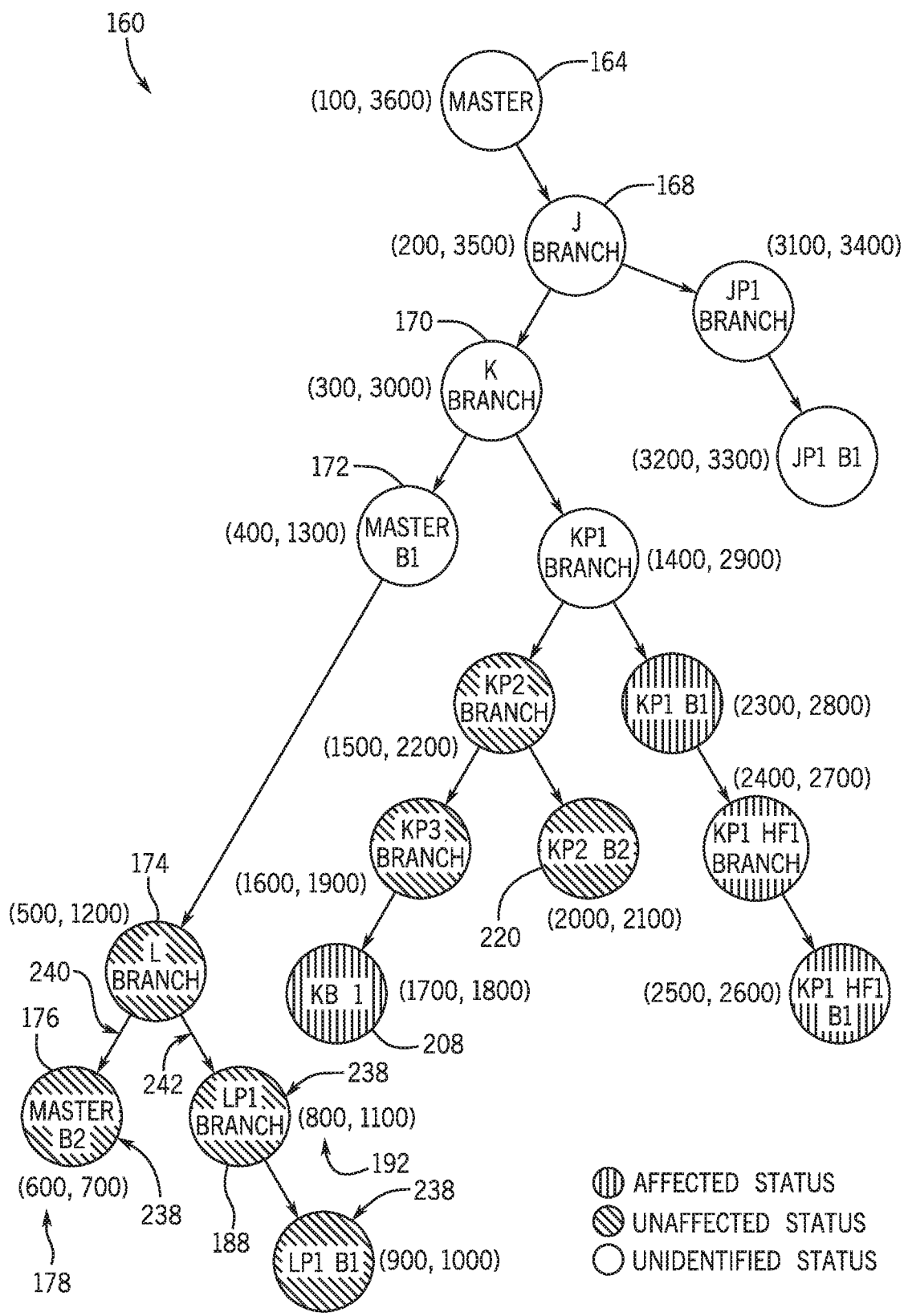
FIG. 11 is a schematic diagram of an embodiment of a hierarchical nodal model of a branch-build timeline illustrating affected versions and unaffected versions of an application, in accordance with aspects of the present disclosure.

The algorithm iteratively repeats the aforementioned steps of the process 200 for each point of interest on the branch-build timeline 100. That is, the algorithm examines all points of interest on the branch-build timeline 100 having a status indication, and uses the examined points of interest to assign an appropriate status indication to the nodes of the hierarchical nodal model 160. In this manner, the algorithm may generate a completed hierarchical nodal model 250, as shown in FIG. 11. The completed hierarchical nodal model 250 catalogues nodes associated with points of interest having a software bug or nodes presumed to have a software bug (e.g., points of interest having an affected status), and nodes associated with points of interest void of a software bug or nodes presumed void of a software bug (e.g., points of interest having an unaffected status). As such, the algorithm may analyze the completed hierarchical nodal model 250 to generate an indication of a first subset of software build files (e.g. build files) associated with the software bug, or presumed to have the software bug, and a second subset of software build files void of the software bug, or presumed void of the software bug. For example, the algorithm may evaluate the nodes of the completed hierarchical nodal model 250 to predict a status indication of the neutral build files 154 of the branch-build timeline 100, thereby enabling a service agent to determine whether a neutral build file 154 is likely to contain a particular software bug. The algorithm may index a status associated with each of the build files 140 in a suitable searchable table or database. In this manner, the algorithm may facilitate selection of versions of an application void of a software bug. For example, in some embodiments, the algorithm may identify a compatible version of an application to which an entity may upgrade to resolve a software bug that is present in a version of the application currently used by the entity.

It should be noted that the algorithm does not assign a status indication to nodes corresponding to points of interest having a datetime preceding a datetime of the chronologically earliest point of interest having a status indication. That is, in the present example, the algorithm does not assign a status indication to nodes of the hierarchical nodal model 160 corresponding to points of interest having a datetime that precedes a datetime of the initial code commit 252 (e.g., as shown in FIG. 4). Advantageously, in this manner, the algorithm does not evaluate points of interest that are not associated with an identified software bug (e.g., points of interest chronologically preceding build files affected, fix targets, or code commits related to a particular software bug), which may reduce a computational time involved in iterating the algorithm over a particular branch-build timeline 100.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A tangible, non-transitory, machine-readable medium, comprising machine-readable instructions, wherein the machine-readable instructions, when executed by one or more processors, cause the one or more processors to perform operations comprising:
    generating a hierarchical model of a plurality of software development streams, wherein each software development stream has an associated creation date;
    identifying points of interest having a status indication comprising a fixed status indication or an unfixed status indication, wherein the points of interest are associated with the plurality of software development streams;
    sequentially inspecting the points of interest in descending order of creation date of the points of interest, from most recent creation date of the points of interest to earliest creation date of the points of interest, to identify descendant development streams associated with the points of interest;
    during each inspection of a particular point of interest of the points of interest:
        traversing the descendant development streams corresponding to the particular point of interest sequentially in descending order of creation date of the descendant development streams, from most recent creation date of the descendant development streams to earliest creation date of the descendant development streams, to identify software build files corresponding to the descendant development streams; and
        during each traversal of a particular descendant development stream of the descendant development streams:
            determining a software build file status indication for the software build files corresponding to the particular descendant development stream based on the identified status indication of the particular point of interest;
            marking unmarked software build files of the software build files devoid of the software build file status indication and descending from the particular point of interests with the fixed status indication or the unfixed status indication based on the identified status indication of the particular point of interest;
            ignoring, marked software build files already associated with the fixed status indication or the unfixed status indication; and
        generating an indication of a first subset of the software build files having the unfixed status indication and a second subset of the software build files having the fixed status indication.

2. The tangible, non-transitory, machine-readable medium of claim 1, wherein generating the hierarchical model of the plurality of software development streams further comprises:
    evaluating a branch-build timeline cataloguing the plurality of software development streams to identify a master software development stream;
    identifying a subset of the points of interest associated with the master development stream;
    traversing the subset of the points of interest in ascending order of creation date of the subset of the points of interest, from earliest creation date of the subset of the points of interest to most recent creation date of the subset of the points of interest, to identify master branchpoints and master software build files; and
    generating nodes on the hierarchical model corresponding to the master branchpoints and the master software build files, wherein the nodes sequentially descend from one another in ascending order of creation date of the master branch points, from earliest creation date of the master branchpoints to most recent creation date of the master branchpoints, and the master software build files corresponding to the nodes.

3. The tangible, non-transitory, machine-readable medium of claim 2, wherein generating the hierarchical model of the plurality of software development streams further comprises:
    generating nodes on the hierarchical model corresponding to remaining subsets of the points of interest descending from the master branchpoints; and
    associating the nodes corresponding to the remaining subsets of the points of interest with respective ones of the nodes corresponding to the master branchpoints.

4. The tangible, non-transitory, machine-readable medium of claim 1, wherein the points of interest comprise at least one of the software build files that are affected, fix targets, branchpoints, code commits, neutral build files, or a combination thereof, and wherein generating the hierarchical model of the plurality of software development streams comprises generating respective nodes on the hierarchical model for the at least one of the software build files that are affected, the fix targets, the branchpoints, and/or the neutral build files.

5. The tangible, non-transitory, machine-readable medium of claim 1, wherein the points of interest are each associated with datetimes indicative of respective creation dates of the points of interest.

6. The tangible, non-transitory, machine-readable medium of claim 1, wherein traversing the descendant development streams further comprises:
determining a commencement point of interest having a datetime consecutive to datetimes associated with remaining points of interest; and
traversing one or more descendant development streams descending from the commencement point of interest in descending order of creation date of the one or more descendant development streams, from most recent creation date of the one or more descendant development streams to earliest creation date of the one or more descendant development streams.

7. The tangible, non-transitory, machine-readable medium of claim 6, wherein traversing the descendant development streams further comprises:
iteratively determining preceding points of interest having respective datetimes chronologically preceding the datetime of the commencement point of interest; and
traversing one or more additional descendant development streams descending from the preceding points of interest in descending order of creation date of the one or more additional descendant development streams, from most recent creation date of the one or more additional descendant development streams to earliest creation date of the one or more additional descendant development streams.

8. The tangible, non-transitory, machine-readable medium of claim 1, wherein the first subset of software build files, the second subset of software build files, or both, include at least one of the software build files indicative of individual versions of an application.

9. The tangible, non-transitory, machine-readable medium of claim 1, wherein the software build files associated with the unfixed status indication are predicted to include a software bug, and the software build files associated with the fixed status are predicted to be void of the software bug.

10. The tangible, non-transitory, machine-readable medium of claim 1, wherein the indication of the first subset of software build files and the second subset of software build files is indexed in a database.

11. A system for evaluating a plurality of software development streams to output an indication of software build files having an unfixed status indication or a fixed status indication, comprising:
a client instance hosted by one or more data centers, wherein the client instance is accessible by one or more remote client networks; and
a processor of the system, wherein the processor is configured to perform operations comprising:
generating a hierarchical model of the plurality of software development streams, wherein the hierarchical model includes a plurality of nodes, wherein the plurality of nodes includes a subset of nodes corresponding to the software build files associated with the plurality of software development streams;
identifying points of interest having a status indication comprising a fixed status indication or an unfixed status indication, wherein the points of interest are associated with the plurality of software development streams;
sequentially inspecting the points of interest in descending order of creation date of the points of interest, from most recent creation date of the points of interest to earliest creation date of the points of interest, to identify descendant development streams associated with the points of interest;
during each inspection of a particular point of interest of the points of interest:
traversing the descendant development streams corresponding to at the particular point of interest sequentially in descending order of creation date of the descendant development streams, from most recent creation date of the descendant development streams to earliest creation date of the descendant development streams, to identify respective nodes of the subset of nodes corresponding to the descendant development streams; and
during each traversal of a particular descendant development stream of the descendant development streams:
determining a nodal status indication for the identified respective nodes of the subset of nodes based on the identified status indication of the particular point of interest and an ancestral relationship of the respective nodes with respect to the plurality of nodes;
marking unmarked nodes of the respective nodes of the subset of nodes devoid of the nodal status indication and descending from the particular point of interest with the determined nodal status indication and ignoring marked nodes of the respective nodes of the subset of nodes already associated with the nodal status indication; and
evaluating the nodal status indication for the identified respective nodes of the subset of nodes to generate an indication of a first subset of the software build files having the unfixed status indication and a second subset of the software build files having the fixed status indication.

12. The system of claim 11, wherein the plurality of nodes further comprises an additional subset of nodes corresponding to branchpoints associated with the plurality of software development streams, wherein the subset of nodes and the additional subset of nodes are hierarchically catalogued on the hierarchical model based at least in part on an ancestral relationship of the branchpoints and the software build files.

13. The system of claim 11, wherein identifying the points of interest having the status indication comprises identifying at least one of the software build files that are affected, fix targets, and/or code commits associated with the plurality of software development streams.

14. The system of claim 11, wherein the processor is further configured to retrieve the status indication of the points of interest from a branch-build timeline of the plurality of software development streams.

15. The system of claim 11, wherein each of the plurality of nodes includes a set of index values interrelating the plurality of nodes, wherein a left index value of the plurality of nodes increases between sequentially descending nodes of the hierarchical model.

16. A method, comprising:

generating a hierarchical model of a plurality of software development streams;

identifying points of interest having a status indication comprising a fixed status indication or an unfixed status indication, wherein the points of interest are associated with the plurality of software development streams;

sequentially inspecting the points of interest in descending order of creation date of the points of interest, from most recent creation date of the points of interest to earliest creation date of the points of interest, to identify descendant development streams associated with the points of interest;

during each inspection of a particular point of interest of the points of interest:

traversing the descendant development streams corresponding to the particular point of interest sequentially in descending order of creation date of the descendant development streams, from most recent creation date of the descendant development streams to earliest creation date of the descendant development streams, to identify software build files corresponding to the descendant development streams; and during each traversal of a particular descendant development stream of the descendant development streams:

determining a software build file status indication for the software build files corresponding to the particular descendant development stream based on the identified status indication of the particular point of interest;

marking unmarked software build files of the software build files devoid of the software build file status indication and descending from the particular point of interest with the fixed status indication or the unfixed status indication based on the identified status indication of the particular point of interest; and ignoring marked software build files already associated with the fixed status indication or the unfixed status indication; and generating an indication of a first subset of the software build files having the unfixed status indication and a second subset of the software build files having the fixed status indication.

17. The method of claim 16, wherein traversing the descendant development streams further comprises:

determining a commencement point of interest having a datetime consecutive to datetimes associated with remaining points of interest; and traversing one or more descendant development streams descending from the commencement point of interest in descending order of creation date of the one or more descendant development streams, from most recent creation date of the one or more descendant development streams to earliest creation date of the one or more descendant development streams.

18. The method of claim 17, wherein traversing the descendant development streams further comprises:

iteratively determining preceding points of interest having respective datetimes preceding the datetime of the commencement point of interest; and traversing one or more additional descendant developments streams respectively descending from the preceding points of interest in descending order of creation date of the one or more additional descendant development streams, from most recent creation date of the one or more additional descendant development streams to earliest creation date of the one or more additional descendant development streams.

19. The method of claim 16, wherein the points of interest comprise at least one of the software build files that affected, fix targets, code commits, branchpoints, neutral build files, or a combination thereof.

20. The method of claim 19, wherein determining the descendant development streams associated with the points of interest comprises determining descendant development streams corresponding to the at least one of the software build files that are affected, the fix targets, and/or the code commits.

\* \* \* \* \*

UNITED STATES PATENT AND TRADEMARK OFFICE
CERTIFICATE OF CORRECTION

PATENT NO. : 11,150,894 B2
APPLICATION NO. : 16/424028
DATED : October 19, 2021
INVENTOR(S) : Bharadwaj et al.

Page 1 of 1

It is certified that error appears in the above-identified patent and that said Letters Patent is hereby corrected as shown below:

In the Claims

Column 22, Line 17, Claim 1, replace "interests" with --interest--.

Column 26, Line 32, Claim 19, insert --are-- between the words "that" and "affected,".

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*